(12) United States Patent
Heidenfeldt et al.

(10) Patent No.: US 12,271,234 B2
(45) Date of Patent: Apr. 8, 2025

(54) COMPUTING DEVICE

(71) Applicant: LENOVO (SINGAPORE) PTE. LTD, Singapore (SG)

(72) Inventors: Mark Christopher Heidenfeldt, Morrisville, NC (US); Sandy Collins, Morrisville, NC (US); Justin Ringuette, Morrisville, NC (US); Richard Todd Wall, Morrisville, NC (US); Mark K. Summerville, Morrisville, NC (US); Aravind Senthil Murugan, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 377 days.

(21) Appl. No.: 17/849,609

(22) Filed: Jun. 25, 2022

(65) Prior Publication Data
US 2023/0418335 A1    Dec. 28, 2023

(51) Int. Cl.
*G06F 1/16* (2006.01)
*H01F 7/06* (2006.01)

(52) U.S. Cl.
CPC .......... *G06F 1/1656* (2013.01); *G06F 1/1616* (2013.01); *G06F 1/1679* (2013.01); *H01F 7/064* (2013.01)

(58) Field of Classification Search
CPC ..... G06F 1/1616; G06F 1/1656; G06F 1/1679
See application file for complete search history.

(56) References Cited

U.S. PATENT DOCUMENTS

| | | | |
|---|---|---|---|
| 6,366,440 B1* | 4/2002 | Kung | E05C 19/16 361/679.55 |
| 10,084,896 B1 | 9/2018 | Cho et al. | |
| 2004/0246666 A1* | 12/2004 | Maskatia | G06F 1/1624 361/679.57 |
| 2020/0233459 A1* | 7/2020 | Sanchez | G06F 1/1677 |
| 2020/0392759 A1* | 12/2020 | Morrison | G06F 1/1607 |
| 2021/0407718 A1* | 12/2021 | Morrison | H01F 7/1811 |

OTHER PUBLICATIONS

McCracken, H., Time, Project Ara: Inside Google's Bold Gambit to Make Smartphones Modular, Feb. 26, 2014 (14 pages).

* cited by examiner

*Primary Examiner* — Jared Fureman
*Assistant Examiner* — Christopher J Clark
(74) *Attorney, Agent, or Firm* — Brian J. Pangrle

(57) ABSTRACT

A computing device can include a processor; memory accessible to the processor; a lithium-ion battery; a power interface; magnet control circuitry operatively coupled to at least the power interface for receipt of electrical power; and a housing for the processor, the memory, the battery, the power interface and the magnet control circuitry, where the housing includes a first shell, a second shell, and an electropermanent magnet assembly that generates a magnetic force that couples the first shell to the second shell, where the electropermanent magnetic assembly is controllable via the magnet control circuitry to decrease the magnetic force to decouple the first shell from the second shell.

20 Claims, 12 Drawing Sheets

COMPUTING DEVICE

TECHNICAL FIELD

Subject matter disclosed herein generally relates to technology for computing or other devices.

BACKGROUND

A notebook computer, or laptop computer, can include two housing joined by a hinge assembly where one or both of the housings is formed by shells such as two shells that can be joined to define a housing space suitable for housing various components.

SUMMARY

A computing device can include a processor; memory accessible to the processor; a lithium-ion battery; a power interface; magnet control circuitry operatively coupled to at least the power interface for receipt of electrical power; and a housing for the processor, the memory, the battery, the power interface and the magnet control circuitry, where the housing includes a first shell, a second shell, and an electropermanent magnet assembly that generates a magnetic force that couples the first shell to the second shell, where the electropermanent magnetic assembly is controllable via the magnet control circuitry to decrease the magnetic force to decouple the first shell from the second shell. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
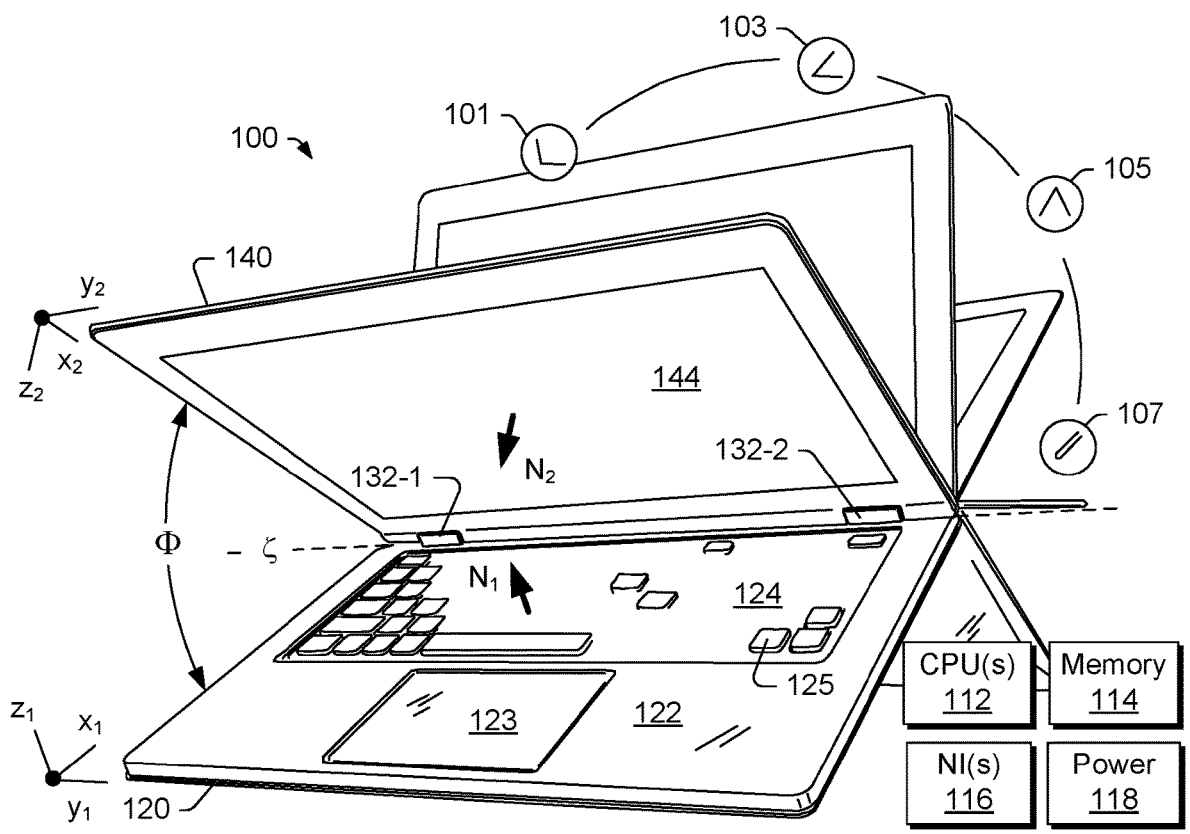
FIG. 1 is a diagram of an example of a device.
Figure 1:
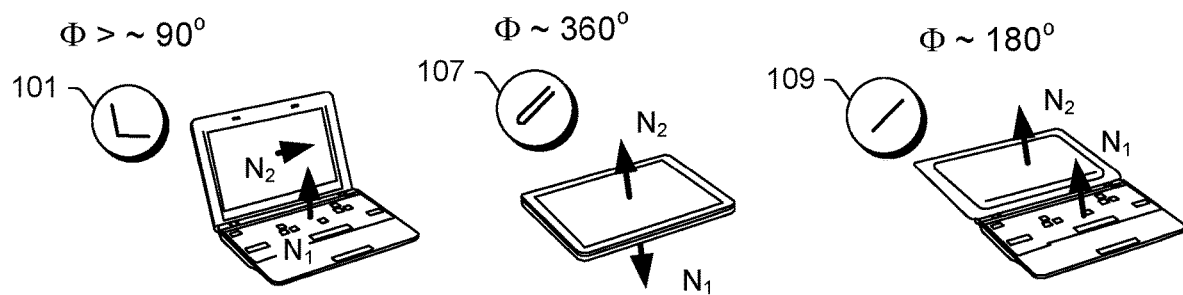

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other, whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
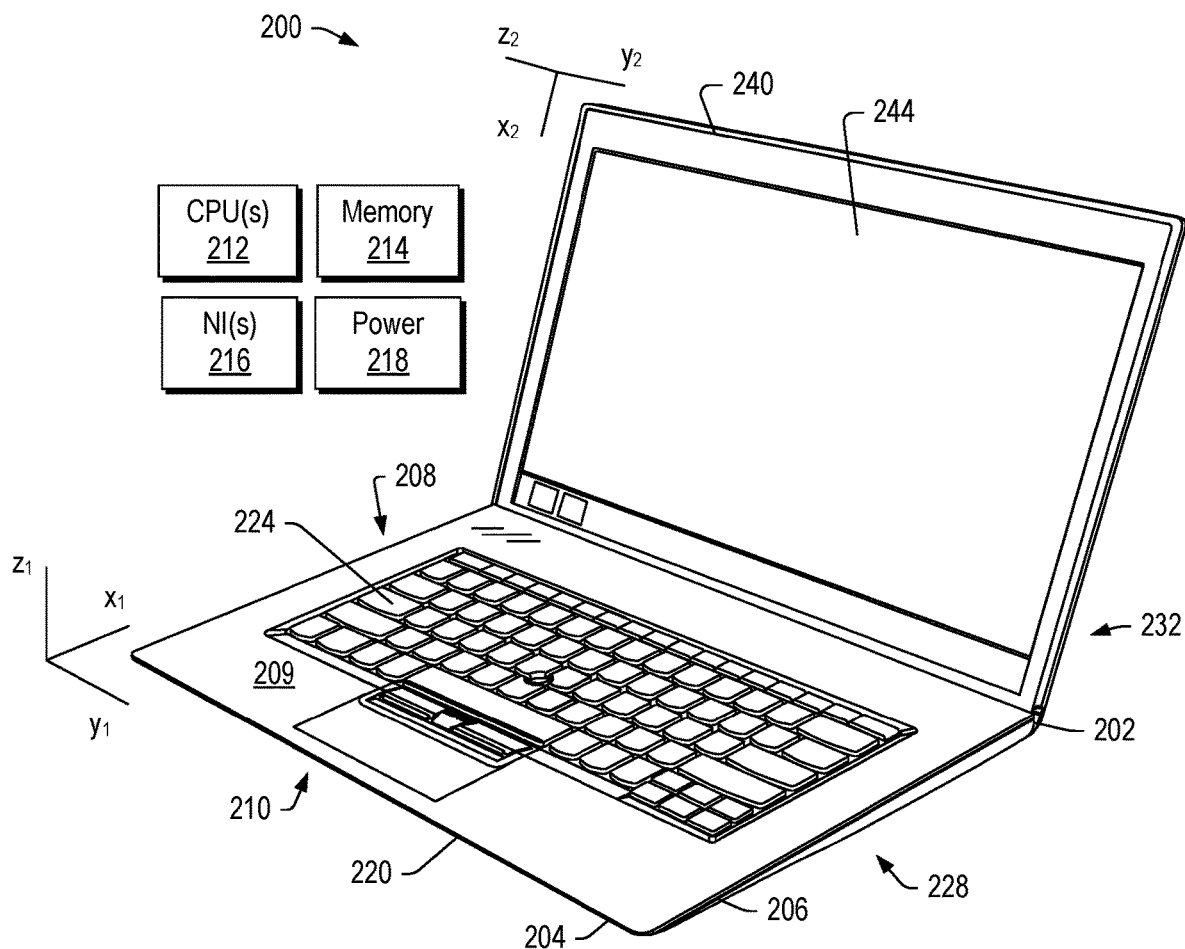
FIG. 2 is a diagram of an example of a device.

FIG. 2 shows an example of a device 200 that includes various features of the device 100 of FIG. 1.

As shown in FIG. 2, the device 200 includes a keyboard housing 220 and a display housing 240 that are pivotable with respect to each other via movement about one or more hinges 232 (e.g., one or more hinge assemblies). The device 200 may be a device such as, for example, a computing device (e.g., an information handling device). As shown, the keyboard housing 220 includes a keyboard 224 (e.g., with typewriter keys) and the display housing 240 includes a display 244.

In the example of FIG. 2, the device 200 includes a hinge assembly side 202, a front side 204, a right side 206, a left side 208, a keyboard side 209 and, opposing keyboard side 209, a bottom side 210. An area defined by the sides 202, 204, 206 and 208 can be a footprint; noting that the bottom side 210 can define a footprint.

As an example, the device 200 may include one or more processors 212, memory 214 (e.g., one or more memory devices), one or more network interfaces 216, and one or more power cells 218. Such components may be, for example, housed with the keyboard housing 220, the display housing 240, and/or the keyboard housing 220 and the display housing 240.

Figure 3:
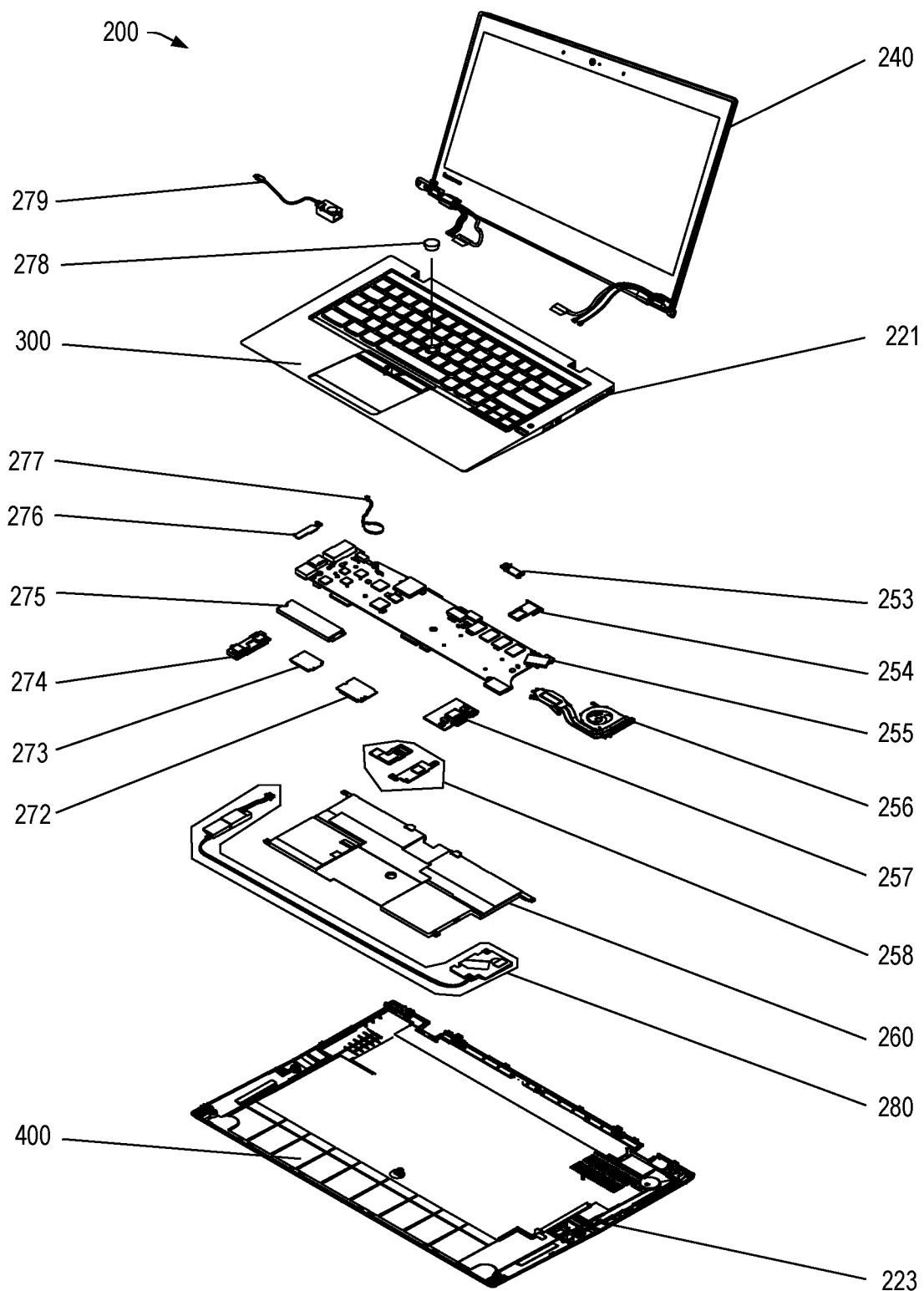
FIG. 3 is a diagram of an example of the device of FIG. 2.

FIG. 3 shows an exploded view of the device 200 of FIG. 2, which shows the display housing 240, an upper assembly of the keyboard housing 221 and a lower assembly of the keyboard housing 223 where the upper assembly of the keyboard housing 221 and the lower assembly of the keyboard housing 223 can be joined to form the keyboard housing 220. As shown, the upper assembly of the keyboard housing 221 includes a keyboard as a human input device. As an example, the lower assembly of the keyboard housing 223 can be a base cover assembly that covers the upper assembly of the keyboard housing 221; noting that various components may be mechanically coupled to the upper assembly of the keyboard housing 221 where, for example, screws, bolts, etc., may be positioned in through bores and/or bosses of the lower assembly of the keyboard housing 223 to thread into bores and/or bosses of the upper assembly of the keyboard housing 221. As an example, during servicing, the lower assembly of the keyboard housing 221 may be removed via unscrewing of screws, bolts, etc., to access various components of the keyboard housing 220. Further, various types of clips may be utilized for securing and/or positioning components where, for example, the clips may be broken, lost, misplaced, etc. Such clips may be metallic and/or plastic and present various issues during servicing or otherwise during lifetime of a computer.

As an example, a laptop computer (e.g., a notebook computer) can include a display housing that is an assembly that includes one or more covers or shells and can include a keyboard housing that is an assembly that includes one or more covers or shells. For example, a display housing can include an A-cover and a B-cover that mate where the A-cover forms a back side of the display housing and where the B-cover forms a bezel on a front side or display side of the display housing about a display (e.g., a display surface) and, for example, a keyboard housing can include a C-cover and a D-cover that mate where the C-cover forms a front side or a keyboard side of the keyboard housing and where the D-cover forms a back side, bottom side or base side of the keyboard housing.

In the example of FIG. 3, the lower assembly of the keyboard housing 223 includes a shell 400 that is a D-cover that covers the upper assembly of the keyboard housing 221, which includes a shell 300 that is a C-cover. In such an example, a D-cover assembly and a C-cover assembly can each include a respective one of the shells 400 and 300 where the shell 400 can be referred to as a D-cover shell and the shell 300 can be referred to as a C-cover shell.

As an example, a shell can be a part that is formed by one or more processes such as, for example, molding (e.g., injection molding), 3D printing (e.g., additive manufacturing, etc.), stamping (e.g., metallic sheet stamping), etc. As an example, a shell can include an injection molded part and a stamped part where, for example, the injection molded part is an insert for the stamped part or vice versa.

Various examples of components are shown in FIG. 3, including a SIM card tray bracket 253, a SIM card tray 254, a system board assembly 255 (e.g., a motherboard), a fan 256, an RJ45 card with a USB connector 257, a fingerprint reader assembly 258, a lithium ion battery 260, a speaker assembly 280, a wireless WAN card 272, a wireless LAN card 273, an audio card with a USB connector 274 (e.g., audio circuitry), a M.2 solid-state drive 275, a DC in bracket 276 (e.g., for DC power), a coin-cell battery (e.g., for back-up power) 277, a trackpoint cap 278 for a trackpoint human input device (HID), and an Ethernet extension adapter 279.

As explained, various components can be housed in a housing that is formed at least in part by two shells that can be joined where if one or more of the components is in need of servicing (e.g., replacement, repair, etc.), the two shells can be decoupled (e.g., de-joined) and/or separated such that one or more of such components can be accessed.

Figure 4:
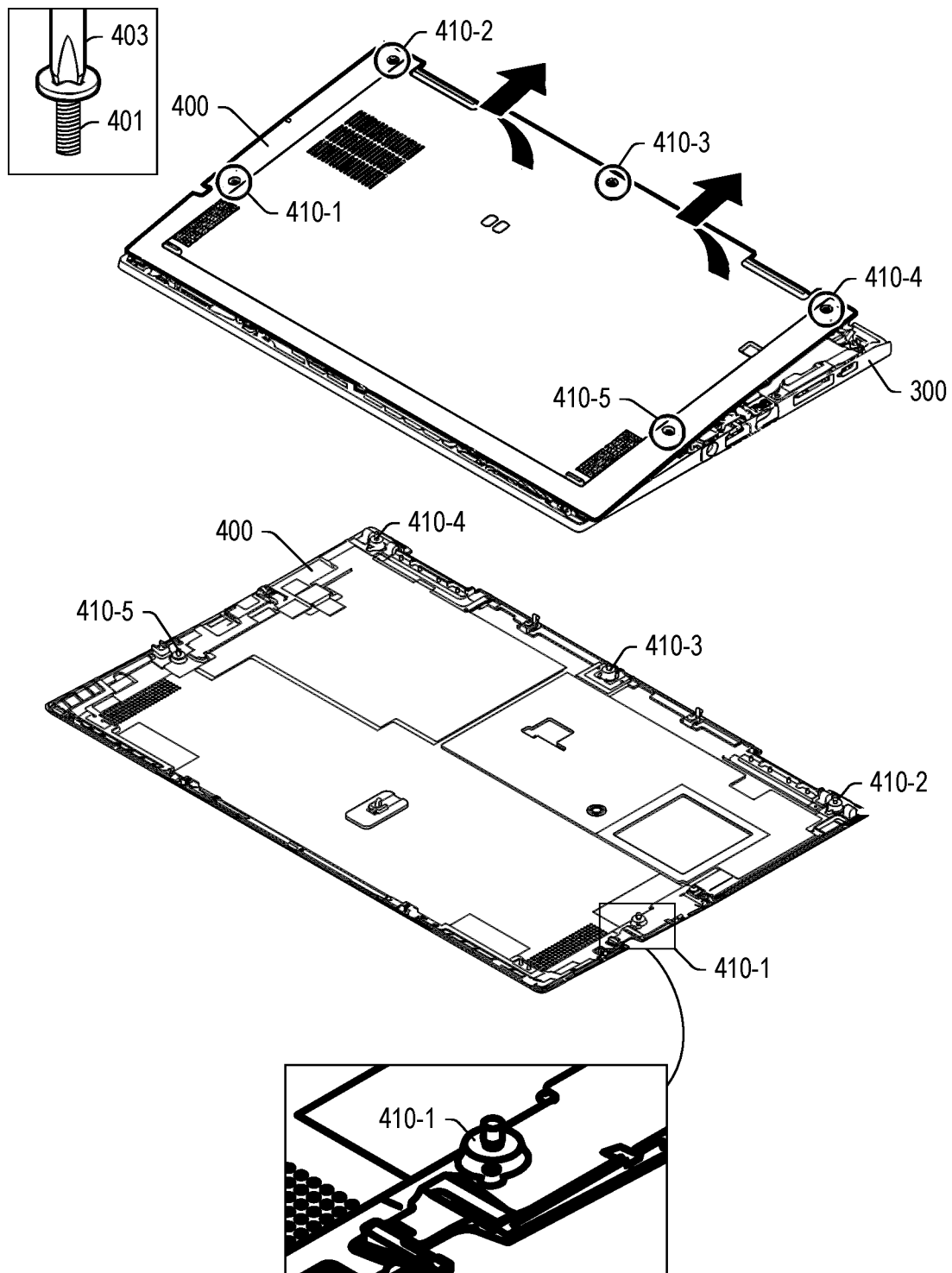
FIG. 4 is a diagram of the example of the device of FIG. 2.

FIG. 4 shows an example of a method with respect to the shells 300 and 400. As indicated, the shells 300 and 400 can be mechanically joined via a number of rotatable securing components 401 (e.g., screws, bolts, etc.) that can be rotated using a tool 403 such as, for example, a screwdriver, a socket wrench, etc. A rotatable securing component may include features such as threads or a bayonet.

In the example of FIG. 4, five receptacles 410-1, 410-2, 410-3, 410-4 and 410-5 are shown as being part of the shell 400 that can each receive an instance of the rotatable securing component 401, which can be rotatable to secure the shell 400 to the shell 300 via corresponding receptacles of the shell 300. As shown in FIG. 4, the shell 400 can be formed of a material (e.g., metal, plastic, carbon fiber, composite, etc.) where each of the receptacles 410-1, 410-2, 410-3, 410-4 and 410-5 has a boss with a through-bore to receive an instance of the rotatable securing component 401. And, correspondingly, the shell 300 includes such bosses, which can include features such as threads, bayonets, etc., that mate with features of the rotatable securing component 401. In such an example, overtightening may result in damage (e.g., stress fractures, stripping, etc.), misalignment may result in damage (e.g., cross-threading, stress fractures, etc.), debris may result in damage, etc. Further, the presence of relatively small screws or bolts can lead to various issues such as, for example, loss, misplacement, vibration or rattling when loose or lost in a housing, electrical short circuiting if conductive and/or placing pressure on a component or components, etc. Additionally, during assembly or disassembly, an individual must have the appropriate tool and take care to not lose or misplace screws, bolts, etc., and to properly align and torque when rejoining two shells of a housing. For various reasons, receptacles and rotatable securing components can be sub-optimal.

Various notebook form factor devices utilize screws to join a D-cover to a C-cover. Screws pose a risk of being over-torqued, which can cause damage to either or both of a C-cover and a D-cover. Further, there is a risk of a screw or screws being lost or left inside a housing, which may present a safety risk or damage components.

Various notebook form factor devices can include one or more tamper protection features, which may include a tamper detection switch operable via BIOS or other firmware that may be involved in a boot or start-up process that can establish an operating system environment suitable for execution of applications, etc. As to a tamper detection switch in a notebook device, if such a switch indicates occurrence of a possible or actual tamper event, to proceed with use of the device a user may have to apply AC power and provide a supervisor password. However, if the password is lost or if the tamper protection circuitry fails (e.g., malfunctions, etc.), the notebook device may become unusable. Other tamper protection features can include use of stickers, for example, to cover a screw. Use of stickers can be readily defeated by either removal or puncture to allow a tool to access screws. Removed and/or punctured stickers (e.g., adhesive backed material such as tape) may provide an indication of tampering, however, removal and/or puncture may occur through ordinary use (e.g., contact in a bag, on a desk, normal wear and tear, etc.).

As an example, a housing formed by two shells can be joined through use of one or more electropermanent magnets (EPMs) where, for example, at least one of the one or more EPMs is in a magnetic attraction state that can be switched off via supply of electrical power and subsequently switched back on via supply of electrical power. In such an approach, electrical power is not required to maintain magnetic attraction coupling force between two shells such that, for example, the coupling mechanism does not demand electrical power from a battery. An EPM may be referred to as a switchable device with a state and state transitions that can be controlled via utilization of current pulses where, for example, a current pulse of one polarity magnetizes materials together, increasing external flow of magnetic flux and where a current pulse of opposite polarity reverses the magnetization of a semi-hard material, while leaving a hard material unchanged, which diverts some or all of the flux to circulate inside the device, reducing the external magnetic flux.

In the instance where access to one or more components in a housing is desired, electrical power can be supplied to an EPM or EPMs (e.g., as a current pulse) such that the magnetic attraction coupling force is switched off. As an example, a device with a housing formed at least in part by two shells can include one or more EPMs in a magnetic state that can join the two shells with sufficient joining force where such force can be reduced via supply of electrical power. Such an example can allow for removal of a D-cover (e.g., D-cover shell) in a manner that does not pose risks of ending with lost items, damaged components, or being a safety hazard. In such an example, one or more tamper protection features may be included, which may be operatively coupled to one or more EPMs and/or one or more circuits operatively coupled, optionally switchably coupled, to one or more EPMs.

As explained, a device can include one or more EPMs that can function as a joining mechanism for C- and D-covers of a housing (e.g., to hold a chassis together, etc.). As an example, a D-cover can include one or more ferromagnetic components (e.g., discs, strips, etc.) at or proximate to an interior side of an outer perimeter of the D-cover while a C-cover can include one or more EPMs that can be selectively turned off via supply of electrical power, for example, through BIOS or other settings to allow access to a system board (e.g., motherboard) and other components of a housing. In such an example, a ferromagnetic component can be referred to as a keeper, which is a term that can be utilized to describe a latch. A ferromagnetic component can include iron and may be a permanent magnet of an appropriate strength and/or polarity.

As an example, an EPM may have a magnetic state, which may be referred to as an "on" state that corresponds to a maximum magnetic field strength, and have an "off" state with a minimum magnetic field strength that can be achieved by supplying a certain amount of electrical power to the EPM (e.g., a current pulse, etc.). In such an example, one or more intermediate states can exist, for example, via control of the amount of electrical power to the EPM. As an example, a method can include supplying electrical power to an EPM to reduce its magnetic field strength such that two shells of a housing can be disjoined. In such an example, the two shells can be in a joined state where the EPM provides a magnetic attraction force that may correspond to the maximum magnetic field strength of the EPM. As explained, a joined state may be achieved using an EPM without supply of electrical power to the EPM. Further, a state of reduced magnetic attraction force may be achieved using an EPM without supply of electrical power to the EPM where transitioning from one state to another state does require supply of electrical power (e.g., a current pulse, etc.).

As an example, a device can include one or more shield elements that can function to shield one or more components from electromagnetic radiation, which may be from a permanent magnet or an EPM. As an example, a shield may be utilized as a barrier to protect one or more components (e.g., EMI sensitive components).

As an example, a change of state of an EPM can be tracked using one or more circuits to provide for tamper detection. For example, if electrical power is supplied in an unauthorized manner to an EPM, circuitry can detect such an event and cause, for example, firmware to require entry of one or more credentials (e.g., a supervisor password, etc.) before allowing a boot process to proceed. As an example, where an unauthorized attempt to supply electrical power to an EPM is detected (e.g., or to pry apart an EPM and a corresponding keeper, etc.), a circuit or circuits that can supply electrical power to the EPM may be disabled, which may require a special tool (e.g., insertion tool, dongle, etc.), firmware access, etc., to enable. In such an approach, the ability to decouple a shell of a housing can be controlled via one or more security measures that can register one or more types of tampering events.

As an example, a device can include a housing formed by two shells joined via magnetic attraction force of one or more EPMs. In such an example, where electrical power is supplied to the one or more EPMs for a state transition to thereby allow for disjoining the two shells, one or more motion and/or orientation sensors may be activated. For example, consider an accelerometer that can sense motion and/or orientation of the housing. In such an example, a security mechanism can demand that the housing be in a certain orientation with respect to gravity (e.g., horizontal, vertical, 40 degrees to 50 degrees, etc.) prior to actually supplying electrical power to the one or more EPMs. In such an example, the orientation may be a secret such that a person that does not know the secret is unlikely to be able to properly orient the housing and, hence, unlikely to be able to have the electrical power actually supplied to the one or more EPMs. While a single orientation is mentioned, a secret can involve transitioning a housing from one orientation to another such that a sequence of different orientations is detected. For example, consider a sequence that involves positioning a hinge end of a housing down and then the hinge end of the housing up. In such an example, a sensor can detect performance of the sequence, which can then trigger supply of electrical power to an EPM or EPMs (e.g., current pulse, etc.) to thereby reduce magnetic attraction force to a level sufficient to disjoin a cover from a housing (e.g., a D-cover shell or a C-cover shell).

As explained, a default configuration of one or more EPMs can pull C- and D-covers together to conserver power (e.g., consider a switched on state of an EPM with respect to a keeper). In such an approach, when the D-cover is intended to be disengaged, electrical power can be supplied to the one or more EPMs to reduce magnetic attraction force to a level sufficient for removal of the D-cover (e.g., to switch EPM state, partially or wholly).

As an example, electrical power may be from one or more electrical power sources. For example, consider a lithium-ion battery that is a main electrical power source of a notebook device where the lithium-ion battery is disposed within a keyboard housing that includes C- and D-covers. As another example, a dedicated electrical power source may be provided, which may be a battery or another type of electrical power storage device (e.g., consider capacitor-based). As yet another example, a device can include one or more electrical power interfaces that can receive electrical power from an electrical power source or sources. For example, consider a USB port, a power brick port, a specialized interface, etc. As an example, where a main battery has insufficient power (e.g., drained below a certain level, dead, etc.), to reduce magnetic attraction force provided by one or more EPMs, electrical power may be supplied via one or more other electrical power sources, which may be an internal source or an external source that can connect via an interface (e.g., wired and/or wireless).

As to a wireless approach, consider the Qi standard technology and techniques where, for example, a device can include an antenna that can receive electrical energy where such electrical energy can be utilized as electrical power for supply to one or more EPMs. As an example, a wired and/or a wireless approach via an interface may depend on a handshake, which may be a secure handshake that depends on one or more credentials (e.g., codes, sequences, etc.). For example, consider a transmitted according to the Qi standard that can provide for transmission of EM energy and a code where the code is authenticated by receiver circuitry before allowing for the EM energy to be provided as electrical power to one or more EPMs.

As an example, a device can include a dedicated battery that can be selectively triggered for use. For example, consider a device that includes a safety reset button that can be installed as a backup in the event that the main battery is unusable or that the device is to be in a powered off configuration. In such an example, when the reset button is pressed, the backup battery can supply electrical power to one or more EPMs to reduce magnetic attraction force to a level that is sufficient to allow for disengaging a cover of a housing of the device. In such an example, the event can be logged and utilized, for example, to trigger one or more features, operations, etc., upon a subsequent power on of the device (e.g., consider a system components check, a firmware check, a tamper check, a tamper reset, etc.).

As an example, a device can include a lithium-ion battery and a power interface. In such an example, one or more EPMs can secure C- and D-covers of a housing in a non-powered state. Once powered, the one or more EPMs can be switched as their state such that magnetic attraction force is reduced for allowing the C- and D-covers to be detached. In such an example, if the lithium-ion battery or an auxiliary battery/capacitor (e.g., dedicated) becomes depleted (e.g., dead battery), then a power interface can allow for supplying power such that the electropermanent magnet(s) can be switched off. As an example, a power interface can be a regular power receptacle (e.g., for connection of a connector of a power brick, etc.) or, for example, a dedicated power interface for one or more EPMs (e.g., and associated circuitry). As explained, a power interface can be a USB interface or port, which may be a specialized USB interface or port that can be provided with electrical power where that electrical power becomes available for powering circuitry associated with one or more EPMs (e.g., for purposes of current pulses for EPM switching, etc.).

As an example, the device 200 can include one or more EPMs that can provide for joining of the shells 300 and 400 via magnetic attraction force where, upon supply of electrical power, the magnetic attraction force can be reduced to allow for removal of one of the shells 300 and 400. In such an example, the device 200 may join the shells 300 and 400 in a screw-less manner. As an example, a device may provide for tool-less removal of a shell of a housing of a device such that time may be conserved when servicing the device. As an example, the device 200 can include one or more tamper detection features that operate at least in part in conjunction with circuitry associated with one or more EPMs.

An electropermanent magnet (EP magnet or EPM) is a type of permanent magnet in which the external magnetic field can be switched on or off, for example, using a current pulse. An EPM can include a "hard" magnetic material (e.g. a relatively high coercivity, e.g., NdFeB or NIB) and a "soft" magnetic material (e.g., a relatively low coercivity, e.g., AlNiCo such as Alnico5), which can be capped at ends with a magnetically soft material (e.g., iron, Fe) and wrapped in a coil. When magnetically soft and hard materials of an EPM have the same magnetization, the EPM produces an external magnetic field that corresponds to an on-state, and when directions of magnetizations are reversed, the EPM produces no net external field across its poles, which corresponds to an off-state. As an example, an EPM can have a magnetic field with no electrical power being supplied to maintain the magnetic field where, if switching is desired, electrical power can be supplied to effectuate switching. As an example, an EPM can be switchable according to a schedule, a signal, etc., where power consumption may be relatively small while in an on-state the EPM provides sufficient magnetic field strength (e.g., for attraction and/or repulsion).

NdFeB (NIB) tends to have a relatively large coercivity (1000 kA/m), while Alnico5 tends to have a relatively small coercivity (48 kA/m); noting both have approximately the same residual induction: 1.28 T and 1.26 T, respectively. When a pulse current (e.g., a current pulse) passes through a coil (e.g., a copper coil, etc.), the polarity of an Alnico5 magnet can change while polarity of a NIB magnet remains the same. In such an example, magnetic field changes according to the polarity of the Alnico5 magnet.

Figure 5:
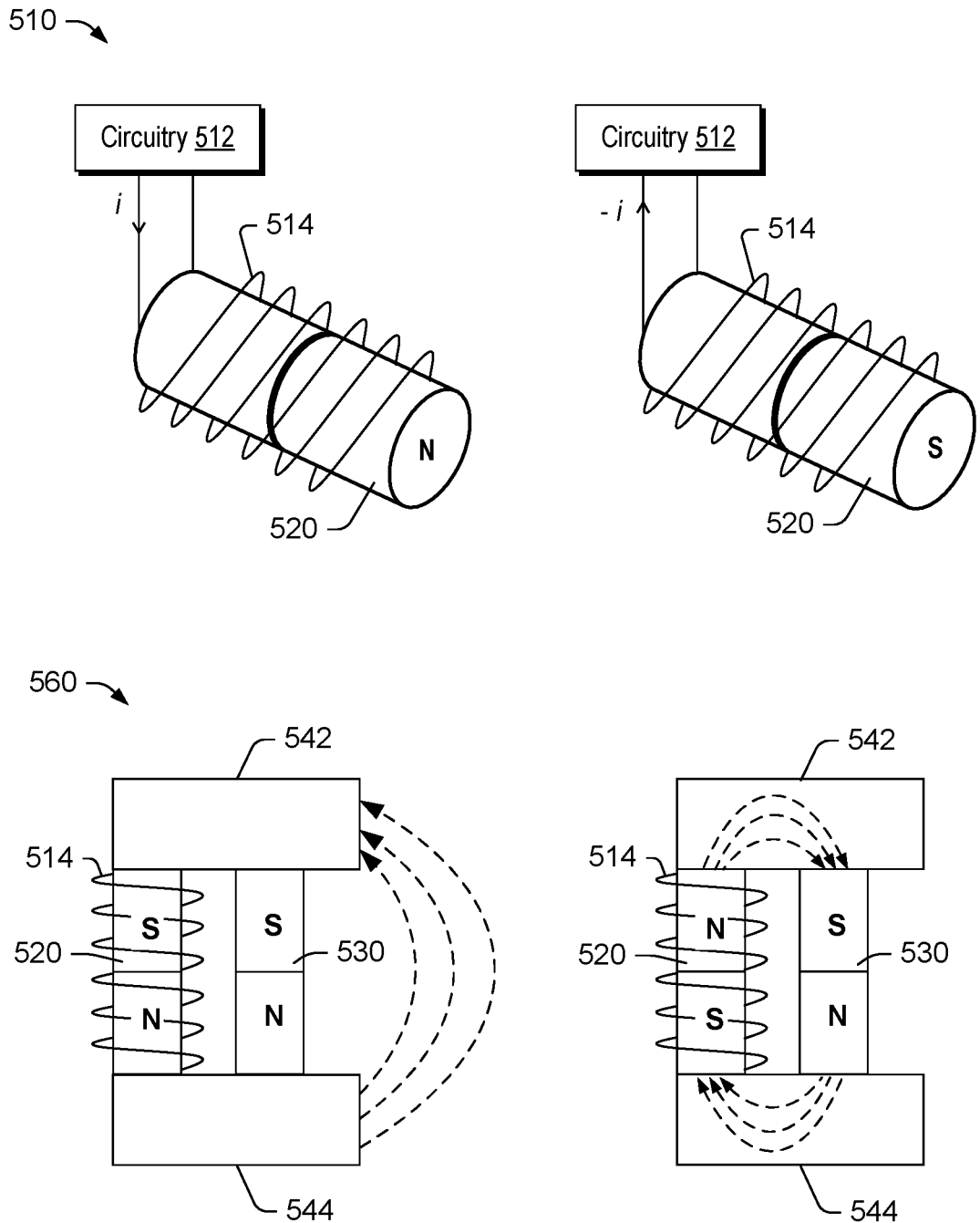
FIG. 5 is a series of diagrams of examples of components and an electropermanent magnet.

FIG. 5 shows an example of a sub-assembly 510 that includes circuitry 512 that can control current through a coil 514 where a magnet 520 of relatively low coercivity material is disposed at least in part within a bore or core of the coil 514. As shown, depending on current supplied by the circuitry 512, the direction of the north-south poles can be switched such that the north pole is fore and the south pole is aft or the south pole is fore and the north pole is aft.

FIG. 5 also shows an EPM 560 that includes the coil 514, the magnet 520, a magnet 530 of relatively high coercivity, and end caps 542 and 544. As shown, the EPM 560 can be in an on-state (left) or an off-state (right) that depends on the current supplied (e.g., by the circuitry 512). In the on-state, magnetic fields of the magnets 520 and 530 are aligned in a common direction (e.g., parallel); whereas, in the off-state, the magnetic fields of the magnets 520 and 530 are not aligned (e.g., anti-aligned or anti-parallel).

In the example of FIG. 5, the EPM 560 may utilize a relatively smaller coil in that the coil 514 does not cover the magnet 530. In other words, the magnet 520 can be disposed at least in part within the bore of the coil 514 while the magnet 530 is not disposed within the bore of the coil 514. As an example, an EPM may include a coil with a bore where magnets are disposed at least in part in the bore where one magnet is of a relatively low coercivity (e.g., switchable pole magnet) and another magnet is of a relatively high coercivity.

As an example, an EPM can include a material such as Alnico5 wrapped in a copper coil where polarity can be switched via a pulse current. As mentioned, a smaller sized coil may reduce overall size and may reduce overall mass compared to a coil that is sized to surround two magnets (e.g., an Alnico5 magnet and a NIB magnet).

As explained, a system may include one or more EPMs. Electromagnetic force can demand specialized materials and high-density coiled geometries while delivering relatively low ratios of force to static power consumption due to the unfavorable scaling of coil resistance in relatively small devices. As an example, a relatively small device may include components with dimensions of the order of millimeters (e.g., less than approximately 15 mm).

An EPM can be suitable for relatively small-scale systems where time between switching events is not too short. Energy to switch an EPM can be proportional to its volume, while it can exert force proportional to its area. In various examples, EPMs do not require coils with as high a density as electromagnets, as long as average time between switching events is sufficiently long.

Figure 6:
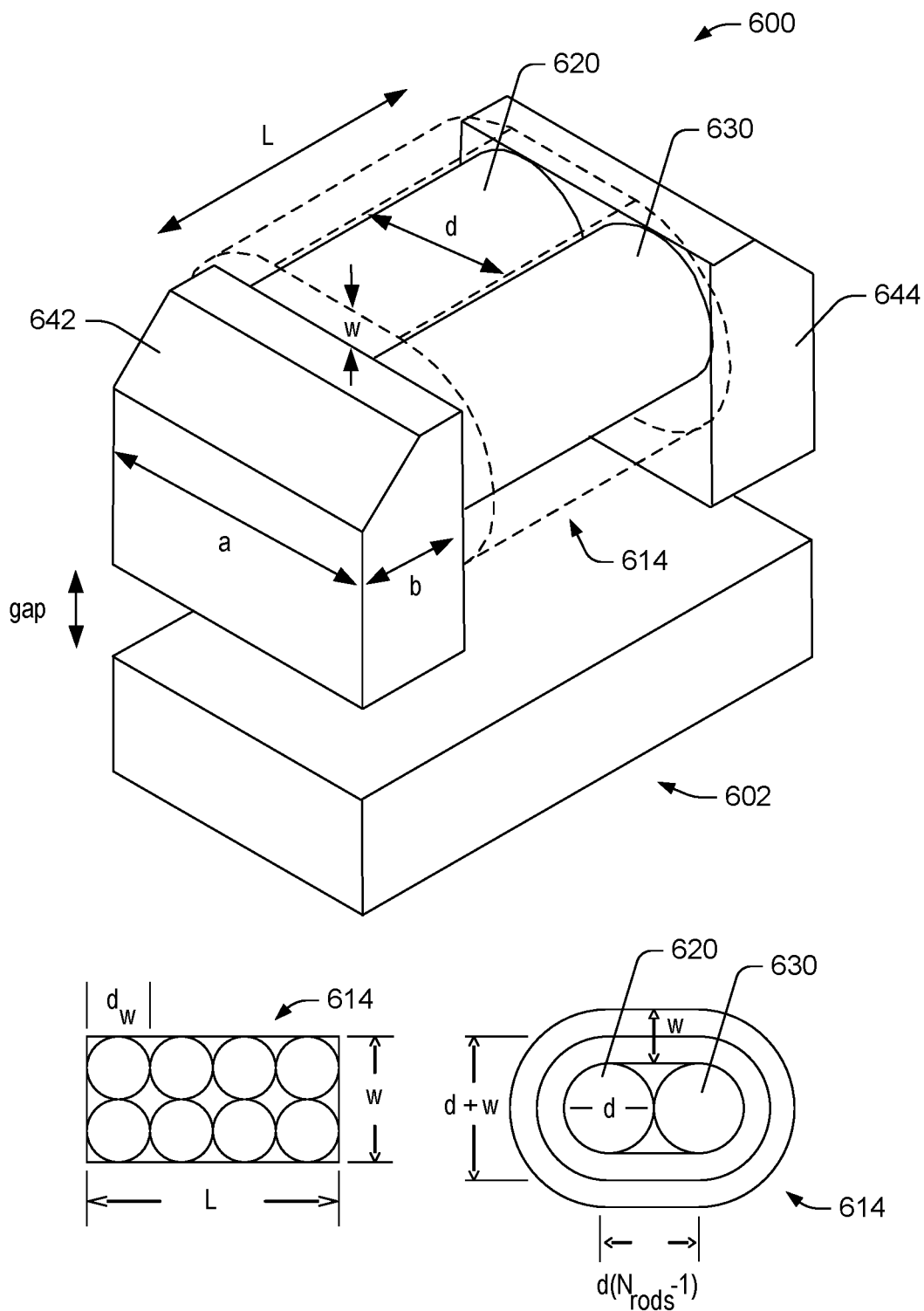
FIG. 6 is a series of diagrams of an example of an electropermanent magnet.

FIG. 6 shows a schematic view of another example of an EPM 600 with a keeper bar 602. The EPM 600 can include a coil 614 disposed about materials 620 and 630 such as, for example, consider a parallel combination of NIB (NdFeB), which has a relatively high coercivity, and Alnico (AlNiCo), which has a relatively lower coercivity (e.g., consider Alnico5). As a NIB magnet has a quite high coercivity, flux through it can be maintained along a common direction. As an example, when the EPM 600 is in its off-state, the NIB and Alnico magnets (see materials 620 and 630) can be oppositely magnetized, such that flux circulates internally and does not cross air gaps to the keeper bar 602. When the EPM 600 is in its on-state, the NIB and Alnico magnets (see materials 620 and 630) can be magnetized in the same direction, such that the flux from both crosses through to the keeper bar 602, and force is required to pull the portions apart. As explained, an EPM can be configured to be in a native magnetized state, which can be considered an on-state, where upon supply of energy (e.g., electrical power), the magnetic field strength of the EPM can be reduced, which may be considered an off-state or a partially-on state.

As an example, an assembly may include one or more permanent magnets where an EPM can be controlled to provide an attraction force or a repulsion force with respect to at least one of the one or more permanent magnets. For example, consider the keeper bar 602 being a permanent magnet with oriented polarity that can be attracted to or repelled from the EPM 600 depending on current supplied to the EPM. As an example, a housing can include an EPM and a magnet where the EPM can be supplied with electrical power to cause it to generate a magnetic field that repels the magnet. In such an example, the EPM can help to disengage a cover from a housing (e.g., to cause the cover to move responsive to the magnetic repulsion force). As mentioned, a housing can include one or more EPMs, which may be configured the same or differently. For example, one or more EPMs may provide for magnetic attraction that joins two shells and one or more EPMs may provide for magnetic repulsion that helps to disjoin the two shells. As an example, where more than one EPM is utilized, the EPMs may be operable in a coordinated manner.

The EPM 600 of FIG. 6 may be compared to an EPM that includes a coil that encompasses the Alnico magnetic material and not the NIB magnetic material. For example, consider a simplified electropermanent magnet (SEP). As an example, a coil and an Alnico5 magnetic material may form a sub-assembly that may be referred to as a simplified electropermanent magnet (SEP), which can be utilized in combination with one or more higher coercivity magnetic materials (e.g., NIB) (see, e.g., an article by Zhu et al., A programmable actuator for combine motion and connection and its application to modular robot, Mechatronics, Elsevier, 2019, 58, pp. 9-19 (arXiv:1904.09889v1 [cs.RO]), which is incorporated by reference herein).

FIG. 6 also shows various dimensions, including a coil thickness w, a coil length L, an NIB diameter and an Alnico diameter d, a gap with respect to a target surface (e.g., of the keeper bar 602), and end component dimensions a and b of the end components 642 and 644. As an example, the dimension b can be less than the dimension a and the dimension L may be greater than the dimension a. As an example, the dimension a may be suitably selected, for example, consider a range from approximately 1 mm to approximately 10 mm (e.g., consider the dimension a being approximately 3.2 mm). As an example, an EPM may be suitably sized for inclusion in a housing to join shells such as, for example, the shells 300 and 400.

As to various parameters, consider, for example, square wire packing where the sum of the area of bounding boxes around each wire equals the total cross-sectional area of the coil. In such an example, consider $Nd^2_w = Lw$. As shown, a middle turn of the coil 614 can have a distance w/2 from the core, where the turn is an average-length turn. In such an example, the total length of the wire can be N times the length of such a turn. By adding the lengths of the straight segments and circular caps, the length of the wire can be defined: $l = N(2d(N_{rods}-1)+\pi(d+w))$.

As to magnetizing voltage and switching energy, consider the DC series resistance of a coil being that of the resistance of the unrolled wire, where the length of the unrolled wire is N times the length of an average-length turn. As the parameter, or dimension, w, approaches zero, the resistance approaches infinity; however, resistance, R, cannot be made arbitrarily small as w approaches infinity such that there are diminishing returns when increasing the coil thickness w much above d in an attempt to reduce R. The voltage drop across the coil is the sum of the induced voltage, from Faraday's law, and the voltage across the series resistance, from Ohm's law. In general, higher voltage can result in faster switching; noting that there is a minimum voltage below which an EPM does not reach the switching field $H_{mag}$ after any amount of time: $V_{min} = I_{max} R$. The minimum voltage is independent of length scale and proportional to the number of turns N. As an example, an EPM may be considered as a series LR circuit where application of a voltage pulse results in a first-order rise in current. Energy for switching can be determined by integrating power over a pulse, where energy can be expressed in terms of inductance, resistance and minimum voltage; noting that the energy can be proportional to the cube of the length scale.

EPMs can demand a uniform energy per volume to magnetize and/or demagnetize. As to some examples of energy sources, consider one or more types of batteries and/or other energy storage devices and/or energy sources whether wired and/or wireless.

As explained with respect to the example of FIG. 6, the EPM 600 can include the coil 614 disposed about materials such as, for example, consider a parallel combination of NIB, which has a relatively high coercivity, and Alnico, which has a relatively lower coercivity. As a NIB magnet has a quite high coercivity, flux through it can be maintained along a common direction. As mentioned a SEP approach may be utilized where a coil encompasses a low coercivity magnetic material such as, for example, Alnico (e.g., Alnico5).

Figure 7:
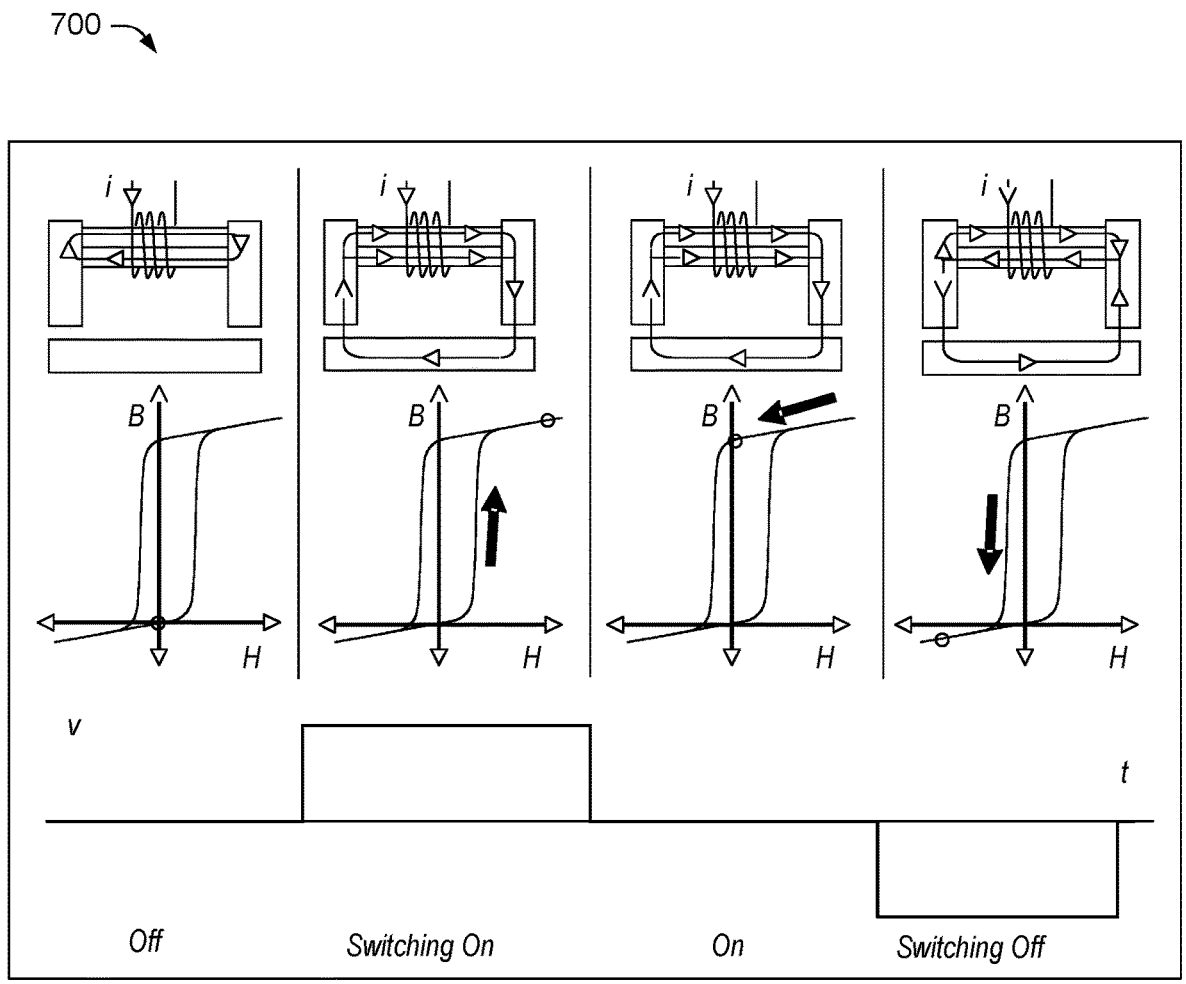
FIG. 7 is a series of diagrams and plots of an example of controlling an electropermanent magnet.

FIG. 7 shows various plots 700 of operation of an EPM such as the EPM 600. As shown, an EPM can be switchable between an on-state and an off-state and vice versa. As explained, an EPM may have a native state that is on or a native state that is off. In the example of FIG. 7, the plots 700 show the off-state where the two magnetic materials are oppositely polarized, so magnetic flux circulates inside the device, and there is no force on the target; whereas, in the on-state, the two magnetic materials are polarized in the same direction, so magnetic flux travels outside the device and through a target, attracting it to the magnet.

As an example, a current pulse in a coil of proper magnitude and sufficient duration can provide for switching an EPM between the on-state and the off-state, for example, by switching the magnetization of the Alnico magnet alone, which has a lower coercivity than the NIB magnet.

The plots 700 of FIG. 7 show operation of an EPM through a full cycle. As shown, a positive current pulse through the coil results in a clockwise flux through the EPM and the keeper, magnetizing the Alnico magnet rightward, turning the device on, while a negative current pulse imposes a counterclockwise flux through the EPM and keeper, magnetizing the Alnico magnet leftward, turning the EPM off.

As to the bistability of an EPM device, NIB and Alnico magnets can be in parallel and of a common length such that they see a common magnetic field H, and their magnetic flux adds. On the scale of the Alnico B/H curve, the NIB B/H curve appears as a horizontal line, because of its higher coercivity. For example, grade N40 NIB can have a coercivity of approximately 1000 kA/m (e.g., with residual induction of approximately 1.28 T) while a sintered Alnico5 can have a coercivity of approximately 48 kA/m (e.g., with residual induction of approximately 1.26 T).

A polarized NIB magnet can bias up a symmetrical B/H curve of the Alnico magnet, such that the two taken together can have a residual induction near zero on the lower part of the hysteresis loop, but a positive residual induction on the upper part of the hysteresis loop. A current pulse through a coil can impose a magnetic field H across the EPM, cycling it around the biased-up hysteresis loop shown in the plots 700.

Figure 8:
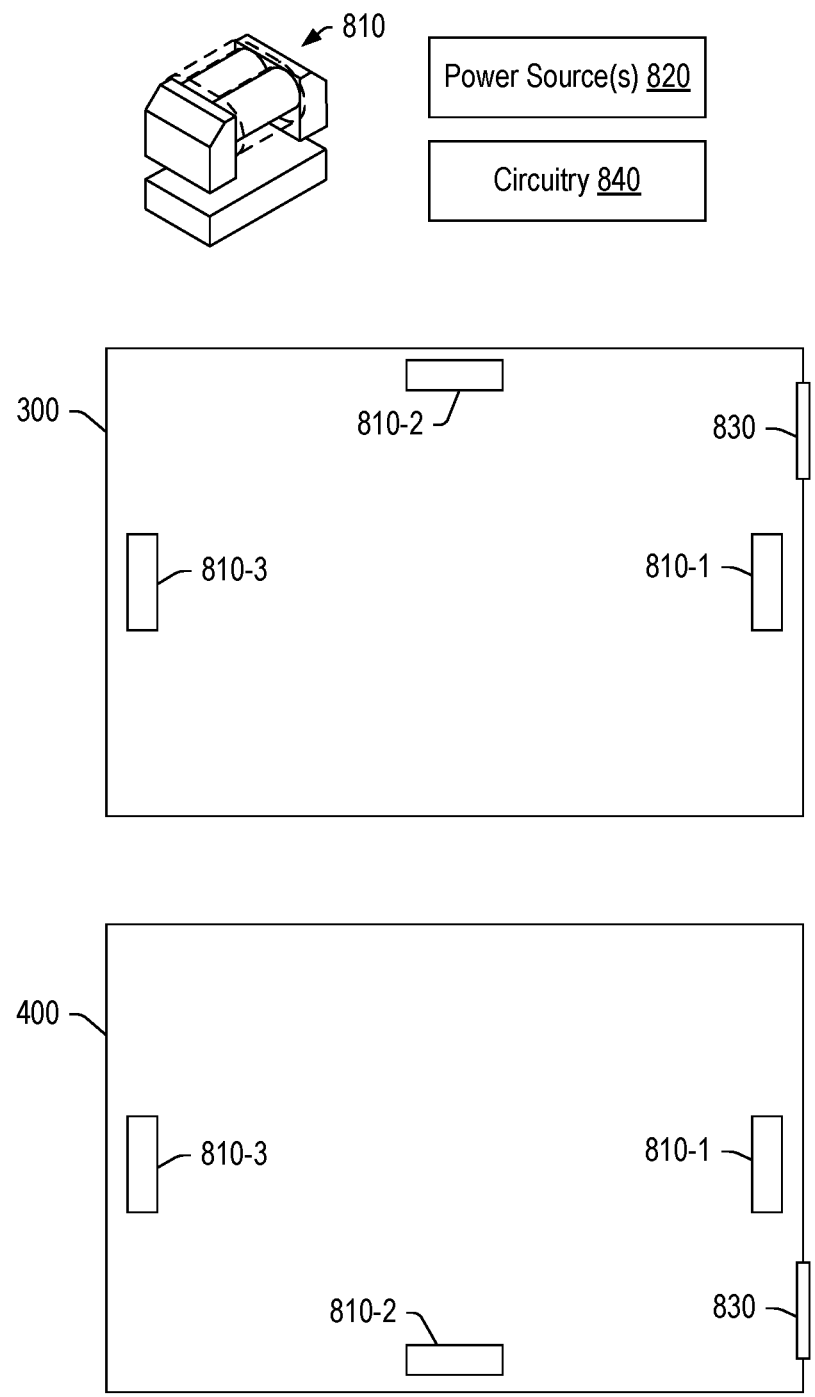
FIG. 8 is a series of diagrams of examples of housing components.

FIG. 8 shows an example of the shell 300 and an example of the shell 400 along with one or more instances of an EPM 810 (e.g., 810-1, 810-2 and 810-3), which can include parts associated with the shell 300 and/or with the shell 400. For example, a keeper may be carried by one shell and a coil/magnet assembly by another shell where the keeper and coil/magnet assembly can interact. As shown in FIG. 8, one or more power sources 820, one or more interfaces 830 and circuitry 840 can be included as part of a housing formed at least in part by the two shells 300 and 400.

As explained, a power source can be an internal electrical power storage device (e.g., a battery, a capacitor, etc.) or may be an external electrical power source that can be electrically (e.g., or electromagnetically) coupled via one or more interfaces. As an example, the one or more interfaces 830 can include one or more wired and/or wireless interfaces.

As an example, an interface may be a physical component that is actuatable such as, for example, a button. As an example, a button may be linked to an electrical power generation device such that mechanical actuation of the button (e.g., depression, turning, etc.) causes generation of electrical power. Such a device may be an energy harvesting device such as an electromechanical converter device. For example, consider a button coupled to an EMC that can provide for generation of a current pulse responsive to depression of the button. In such an example, the circuitry can be electrically coupled to the EMC and to one or more EPMs where the circuitry may provide for one or more conditions before supply of electrical power to the one or more EPMs. For example, as mentioned, a notebook device may be required to be in a particular state, orientation, etc., before a shell can be released. In such an example, an accidental depression of the button or an attempt to tamper by depressing the button can be checked via circuitry where the circuitry decides whether to supply electrical power to one or more EPMs and/or to record the button depression event.

As an example, an interface may be a physical component that is actuatable such as, for example, a key. For example, consider a key that may be rotatable in a key socket to cause actuation of circuitry associated with one or more EPMs. In such an example, the key may be rotated a number of degrees to operatively coupled a power source and circuitry that can control switching of one or more EPMs. For example, consider a key that can connect a power source to circuitry to electrically power the circuitry, which, in turn, can generate one or more current pulses for receipt by one or more EPMs to cause the one or more EPMs to transition from one state to another state. In such an example, the key may be utilized for increasing magnetic attraction force between two shells and/or for decreasing magnetic attraction force between two shells. As an example, a key may be a relatively flat disk shaped component that may be substantially flush with a surface of a housing (e.g., a shell surface) where the key may include a socket where a tool can be inserted into the socket to turn the key. In such an example, the socket may be a tool keyway where the tool operates as a tool key. In such an example, the socket may be a specialized socket that can be turned with a specialized key, access to which may be controlled by a service provider (e.g., administrator, etc.).

As an example, a tool may include a power source or couple to a power source. For example, consider a socket that includes contacts where a tool can transfer electrical energy via the contacts to provide electrical power to circuitry that is operatively coupled to one or more EPMs. In such an example, the tool may include a handle that can receive one or more batteries where the one or more batteries can provide for electrically powering circuitry and/or one or more EPMs. As an example, a tool may be received by a socket where the socket is to be turned, depressed, etc., using the tool or, for example, insertion of the tool in the socket may be sufficient without turning, depression, etc.

Referring to the tool 403 and the screw 401 of FIG. 4, the tool 403 may be adapted to include electrical contacts and the screw 401 may be adapted to be a component that includes electrical contacts that can mate with those of the tool 403. In such an example, a head of the screw 401 may be exposed but not include a threaded shaft; rather, it may be part of a circuit that is operatively coupled to an EPM or EPMs. In such an approach, an exterior of a housing may appear to be a screw secured housing while it is in actuality a housing with shells secured via one or more EPMs.

As an example, a computing device can include a processor; memory accessible to the processor; a lithium-ion battery; a power interface; magnet control circuitry operatively coupled to at least the power interface for receipt of electrical power; and a housing for the processor, the memory, the battery, the power interface and the magnet control circuitry, where the housing includes a first shell, a second shell, and an electropermanent magnet assembly that generates a magnetic force that couples the first shell to the second shell, where the electropermanent magnetic assembly is controllable via the magnet control circuitry to decrease the magnetic force to decouple the first shell from the second shell. For example, the computing device 200 can include the shells 300 and 400 as part of a housing, at least one of the one or more EPMs 810-1, 810-2 and 810-3, a lithium-ion battery as one or more of the power sources 820 where at least one of the interfaces 830 is a power interface for receipt of electrical power and where the circuitry 840 is or includes magnet control circuitry. In such an example, the at least one of the one or more EPMs 810-1, 810-2 and 810-3 (e.g., electropermanent magnetic assembly or assemblies) can be controllable via the circuitry 840 to decrease the magnetic force to decouple the shell 400 from the shell 300. In such an example, the magnetic force can be increased when re-coupling the shell 400 and the shell 300 is desired. For example, the plots 700 of FIG. 7 shows how a current pulse can be directed to a coil to switch an EPM from an on state to an off state and vice versa. As an example, the circuitry 840 can include and/or be operably coupled to one or more sensors. For example, consider a sensor or sensors such as motion sensors, orientations sensors, etc. (e.g., accelerometers, gravity direction meters, gyroscopes, mercury switches, etc.).

As an example, a sensor can be or include a magnetic field sensor such as, for example, a Hall effect sensor, which may be present proximate to an EPM to detect a field strength and/or a polarity of an EPM. As an example, a Hall effect sensor may be positioned or positionable proximate to a magnet, which may be a permanent magnet such as an EPM or a non-EPM permanent magnet. A magnetic field sensor may be utilized for feedback, control, security, etc. For example, a magnetic field sensor may be utilized in combination with circuitry that can generate a current pulse to measure the effect of a current pulse on an EPM or EPMs. In such an example, a current pulse may be controlled to have an appropriate duration and/or magnitude such that an EPM is properly adjusted (e.g., switched, etc.) as to its magnetic field strength.

As explained, upon a reduction in a magnetic attraction force, a shell may be removable from another shell. In such an example, a spring mechanism, whether a physical spring mechanism and/or a magnetic spring mechanism may facilitate removal. For example, consider switching of an EPM or EPMs such that a magnetic repulsion force is generated, which may help to move a shell. As an example, shells may be coupled using a tongue and groove mechanism. For example, consider a translational mechanism where one shell includes a tongue and another shell includes a groove. In such an example, shells may be joined mechanically via the tongue and groove and additionally via a magnetic attraction force that hinder translation where the magnetic attraction force can be reduced via supply of electrical power such that translation is possible. As an example, shells may be joined via a magnetic attraction force where a tongue and a groove do not align such that translation is not possible. In such an example, upon a reduction in the magnetic attraction force, the tongue and groove may align such that translation is possible. For example, shells may be spring loaded where a magnetic attraction force overcomes a spring force to move one shell with respect to the other such that a tongue and a groove are not aligned. In such an example, once the magnetic attraction force is reduced to a level that is less than the spring force, the spring force may move the one shell such that the tongue and the groove are aligned and translation of one shell with respect to the other shell is possible (e.g., for access to a space defined by and between the two shells).

Figure 9:
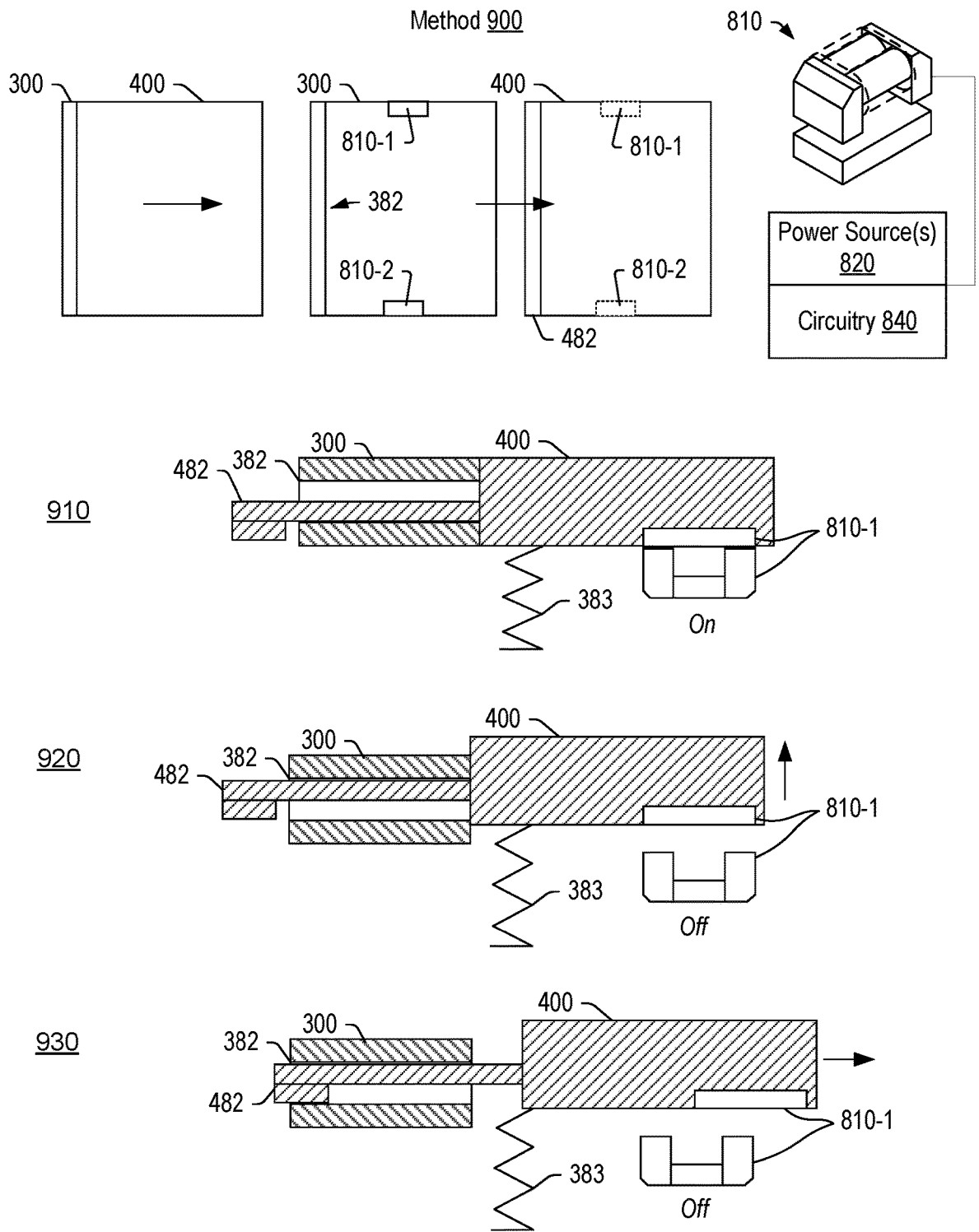
FIG. 9 is a series of diagrams of an example of a method and examples of components of a housing.

FIG. 9 shows an example of a method 900 with respect to the shells 300 and 400 and EPMs 810-1 and 810-2 along with one or more power sources 820 and circuitry 840 where a tongue 482 of the shell 400 can cooperate with a groove 382 of the shell 300 (e.g., or vice versa) and where a spring 383 may be present, for example, as a mechanical or a magnetic spring (e.g., an EPM or permanent magnet for repulsion). In the example of FIG. 9, the EPMs can be EPM assemblies, for example, with appropriate keepers or ferromagnetic material (e.g., permanent magnets, material including iron, etc.). As an example, one or more tongues and one or more grooves may be utilized for purposes of alignment, security, physical connection, etc., between the shells 300 and 400 where the shell 300 can include one or more tongues and/or one or more grooves and where the shell 400 can include one or more grooves and/or one or more tongues.

As shown in the example of FIG. 9, in a latched state 910 the tongue 482 can be received by the groove 382 where a portion of the tongue 482 hinders translation in a direction required for removal of the shell 400 from the shell 300. In the latched state 910, the EPM 810-1 (e.g., an EPM and keeper assembly) may provide sufficient magnetic attraction force to overcome a spring force as may be present from a mechanical spring or a magnetic spring, the latter of which may be controllable via circuitry. In an unlatched state 920, the magnetic attraction force of the EPM 810-1 is reduced such that the shell 400 is forcibly biased upwardly such that the tongue 482 moves in the groove 382 such that alignment occurs. In a translational state 930, the tongue 482 can be translated in the groove such that the shell 400 can be translated with respect to the shell 300 for access to one or more components in a housing formed by the shells 300 and 400.

As explained, one or more mechanisms may be included in a housing such that shells of the housing are properly aligned when closed, facilitate coupling or decoupling (e.g., joining and disjoining), provide for additional security, etc. For example, in FIG. 9, the tongue 482 can provide a mechanical stop with respect to the groove 382 such that translation of the shell 400 with respect to the shell 300 is mechanically hindered, for example, along with being hinder via a magnetic attraction force. In such an approach, the magnetic attraction force as a deterrence to tampering can be supplemented by the mechanical interaction of features of the shells 300 and 400.

In the example of FIG. 9, one or more components may be utilized to provide for a translational force that can facilitate movement of the tongue 482 in the groove 382. For example, an end of the tongue 482 may be biased using a spring, which may be a mechanical spring and/or a magnetic spring (e.g., via magnetic repulsion and/or magnetic attraction). As an example, the tongue 482 can include a magnet that is repelled by another magnet such that translation of the tongue 482 in the groove 382 is facilitated by the repulsion.

Figure 10:
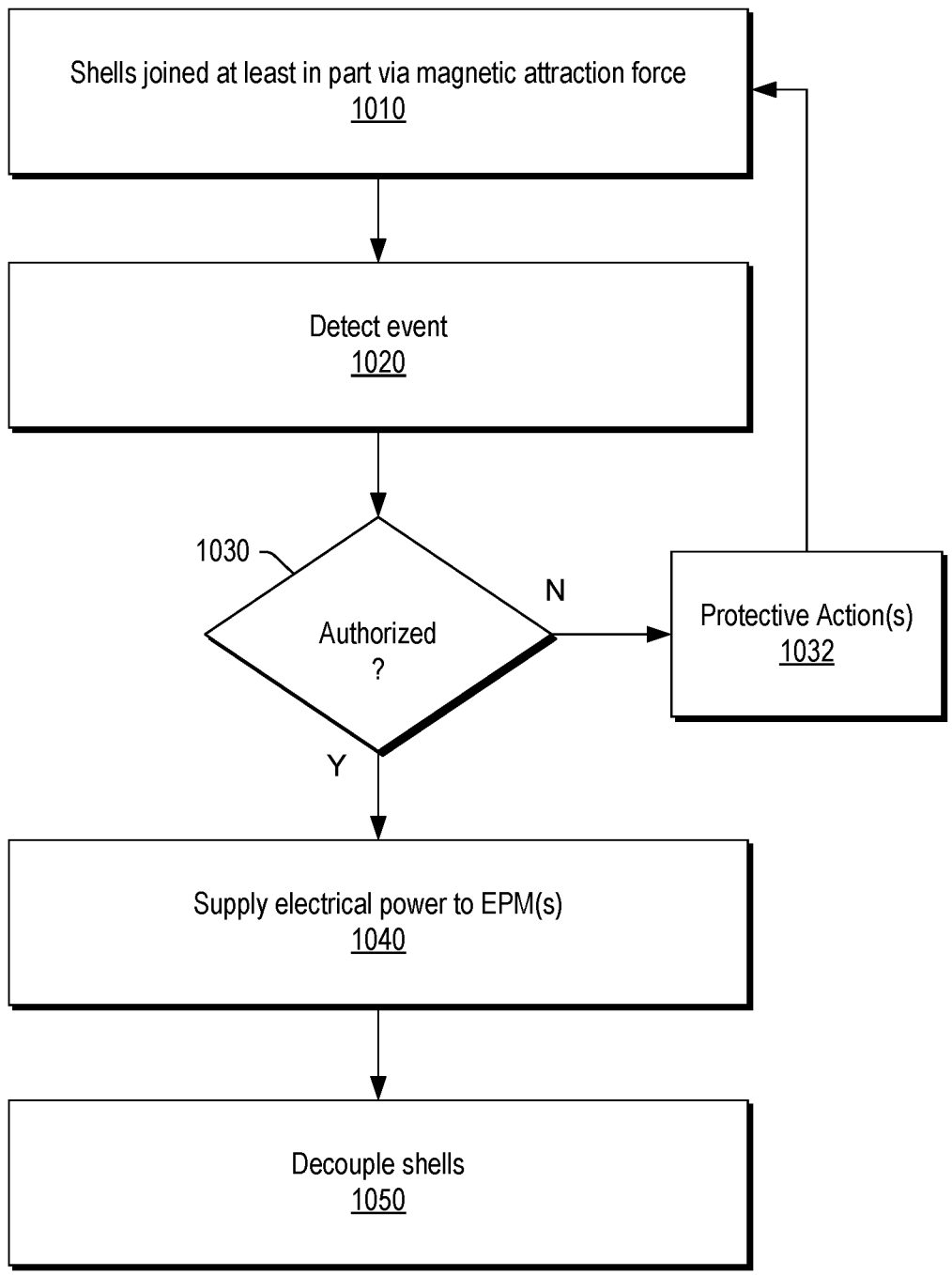
FIG. 10 is a diagram of an example of a method.

FIG. 10 shows an example of a method 1000 that includes a joined block 1010 where shells of a housing are joined at least in part via magnetic attraction force, a detection block 1020 for detecting an event, a decision block 1030 for deciding whether the detected event is authorized, a supply block 1040 for supplying electrical power to one or more EPMs and a decouple block 1050 for decoupling the shells (e.g., removing one of the shells to access one or more components in the housing). As shown in the example of FIG. 10, if the decision block 1030 decides that the detected event is not authorized, the method 1000 can proceed to a protective action block 1032 for taking one or more protective actions. The method 1000 may then continue to the joined block 1010 where the shells remain joined via the magnetic attraction force.

As explained, a detected event can be a tampering event such as an attempt to decouple the shells via one or more means (e.g., prying, supplying electrical power, pressing a button, etc.).

Figure 11:
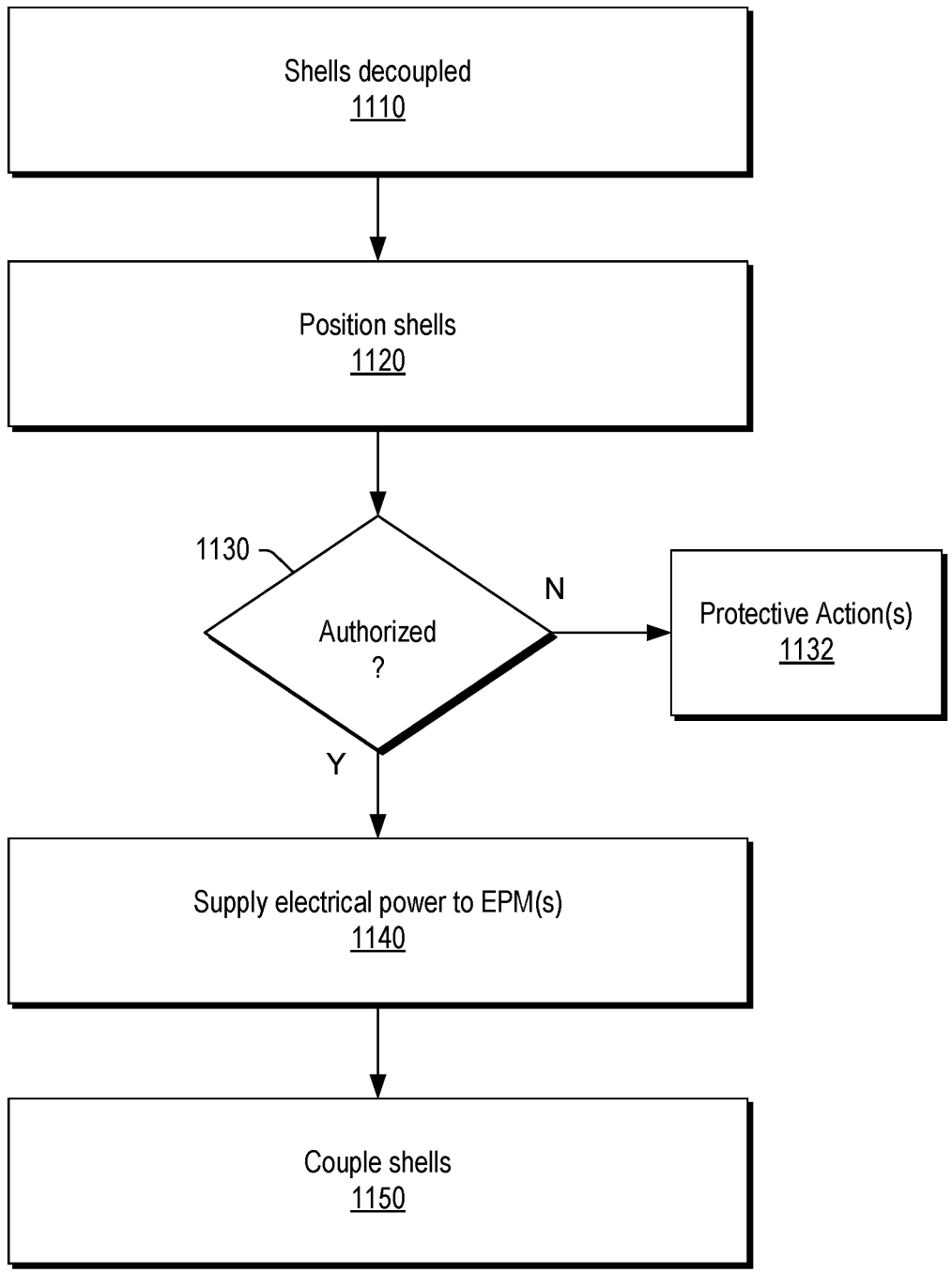
FIG. 11 is a diagram of an example of a method.

FIG. 11 shows an example of a method 1100 that includes a decoupled block 1110 where two shells are decoupled (e.g., for providing two decoupled shells of a housing), a position block 1120 for positioning the two shells for purposes of coupling the two shells (e.g., joining the two shells), a decision block 1130 for deciding whether coupling of the two shells is authorized, a supply block 1140 for supplying electrical power to one or more EPMs and a couple block 1150 for coupling the shells (e.g., joining the shells to secure one or more components in the housing). As shown in the example of FIG. 11, if the decision block 1130 decides that the authorization is not present, the method 1100 can proceed to a protective action block 1132 for taking one or more protective actions.

As an example, a service provider, a user, etc., may be able to decouple the two shells but may not be able to recouple them and/or reset a computing device that includes the two shells without proper authorization. As an example, consider a user or service provider that aims to replace a field replaceable unit (FRU) where upon replacement the user or service provider must access information on a website to indicate that the component was installed, optionally with specifics as to the component and/or the component that was replaced (e.g., consider serial number or other identifying information as to the component and/or its condition). Once such appropriate entry or entries are made, which may be automated or semi-automated (e.g., consider using a cell phone camera, etc.), the user or service provider may be provided with a code or other credential that can be entered to cause supply of electrical power to one or more EPMs and/or to take one or more other actions (e.g., security measures, resets, firmware checks, etc.) such that the method 1100 can proceed to the couple block 1150 where the shells are coupled and the components of the housing ready for use upon an appropriate boot procedures. In such an example, the website may be part of a distributed computing system that can include one or more storage devices for storing information germane to a computer such as a notebook computer. For example, consider storing information such as service history, tampering history, etc.

As an example, the device 200 can include various features of a notebook or laptop computer such as the LENOVO THINKPAD X1 CARBON laptop, which has exterior dimensions of 33 cm×23 cm×1.8 cm, equating to a total volume of 1,366.2 cm; noting that the keyboard housing is a fraction of the total volume (e.g., approximately 0.7 or 70 percent). Components of a clamshell laptop are disposed in a keyboard housing and in a display housing. Components disposed in a keyboard housing include a keyboard assembly (e.g., backlit keyboard with keyboard bezel and trackpad) and can include, for example, a micro-SIM-card-tray bracket, a micro-SIM-card tray, a system board assembly, a thermal fan, a RJ45 card with USB connector, a fingerprint reader assembly, a battery, one or more speaker assemblies, a wireless WAN card, a wireless LAN card, an audio card with USB connector, a M.2 solid-state drive, a dc in bracket, a coin-cell battery, and an Ethernet extension adapter. As to components disposed in a display housing, consider an LCD unit, an LED unit, digitizer circuitry, touch circuitry, etc. As explained, a keyboard housing can include a C-cover and a D-cover that can be joined to form the keyboard housing and define a space therein for various components. As explained, such a keyboard housing can include one or more EPMs for purposes of joining a C-cover and a D-cover, which may be in an intelligent manner that provides for integration with circuitry for one or more purposes (e.g., security, tamper detection, servicing, ease of manufacture, quality control, etc.).

As an example, a computing device can include a processor; memory accessible to the processor; a lithium-ion battery; a power interface; magnet control circuitry operatively coupled to at least the power interface for receipt of electrical power; and a housing for the processor, the memory, the battery, the power interface and the magnet control circuitry, where the housing includes a first shell, a second shell, and an electropermanent magnet assembly that generates a magnetic force that couples the first shell to the second shell, where the electropermanent magnetic assembly is controllable via the magnet control circuitry to decrease the magnetic force to decouple the first shell from the second shell.

As explained, an electropermanent magnetic assembly can include a keeper such as a keeper bar or other shaped piece of suitable ferromagnetic material that can be attracted to an electropermanent magnet when the electropermanent magnet is in an on state. As an example, an electropermanent magnet may be carried by one shell or by more than one shell and a keeper may be carried by one shell or by more than one shell. As explained, a reduction in power supplied to an electropermanent magnet can cause a reduction in a magnetic attraction force, which may be suitably reduced for purposes of decoupling a shell of a housing from another shell of the housing. As mentioned, a spring may be included in a housing where a reduction in a magnetic attraction force may result in a transition of a spring from a compressed state to a less compressed state, which may be an uncompressed state (e.g., a free standing state). As explained with respect to the example of FIG. 7, an electropermanent magnet may be switched on and off through supply of current, which may be supplied as a positive current or as a negative current where an amplitude and/or duration of the current supplied may be controlled, which may thereby switch an electropermanent magnet from one state to another or otherwise increased or reduce the strength of a magnetic attraction force between an electropermanent magnet and a keeper where an increased strength can be for coupling two shells of a housing and where a reduced strength can be for decoupling the two shells of the housing.

As an example, magnet control circuitry can be activated by supply of power to a power interface of a housing. As an example, magnet control circuitry can be in an inactive state when electrical power of a battery is depleted.

As an example, a housing of a computing device can include a ferromagnetic target material (e.g., in the form of a keeper, etc.), where a magnetic force is a magnetic attraction force between an electropermanent magnet assembly and the ferromagnetic target material.

As an example, magnet control circuitry can reverses polarity of a magnet of an electropermanent magnet assembly to decrease magnetic force. In such an example, the magnet can include AlNiCo (e.g., an AlNiCo magnet).

As an example, an electropermanent magnet assembly can include a coil that surrounds at least one magnet. In such an example, magnet control circuitry can be or can include a current pulse generator electrically coupled to the coil.

As an example, a first shell and a second shell of a housing can include a tongue and a groove and where a magnetic force of an electropermanent magnet assembly is controllable via magnet control circuitry to cause movement between the tongue and the groove. In such an example, the movement can include linear movement to couple the first shell to the second shell or linear movement to decouple the first shell from the second shell. As an example, linear movement can be in one or more directions. For example, where a shell is spring-biased, a reduction in magnetic force may provide for movement of the shell with respect to another shell due in part to a spring force. As explained with respect to the example of FIG. 9, a spring may help position a shell with respect to another shell such that the shells can be at least in part decoupled from one another (e.g., to access an interior space of a housing).

As an example, a computing device can include firmware instructions stored in memory that are executable by a processor to establish a firmware environment. In such an example, magnet control circuitry of the computing device may be controllable via the firmware environment. As an example, a status of magnet control circuitry can be detectable via a firmware environment.

As an example, a computing device can include operating system instructions stored in memory that are executable by a processor via a boot process to establish an operating system environment. In such an example, the boot process can depend on a tamper detection status of magnet control circuitry. For example, for a tamper detection status that indicates tampering, the boot process can disallow (e.g., not allow) for establishment of the operating system environment; whereas, without such a status, the boot process can allow for establishment of the operation system environment. In such an example, an individual that tampers with a computing device may cause the computing device to detect tampering and set a tamper detection status indicative of tampering where that status disables or otherwise disallows one or more operations of the computing device (e.g., powering on, booting, establishment of an operating system environment, etc.).

As an example, a computing device may include a network interface that can transmit a signal responsive to detection of tampering. As to detection of tampering, consider, for example, a Hall effect sensor that can detect a change in a magnetic field strength where an electropermanent magnet may be pulled even slightly away from the Hall effect sensor (e.g., or vice versa) and/or one or more accelerometers that may detect movements indicative of tampering. As an example, where a first shell includes an accelerometer and a second shell includes an accelerometer, a differential in accelerometer signals may indicate that the first and second shells are not moving together in unison, which may be an indicator of tampering (e.g., trying to remove one shell from the other shell). As an example, detection of tampering may utilize one or more types of sensors and/or detection techniques.

As an example, a computing device can include a shield material disposed at least in part between an electropermanent magnet assembly and an electronic component disposed in a housing of the computing device.

As an example, a computing device can include a power storage unit, where magnet control circuitry is electronically coupled to the power storage unit for control of an electropermanent magnet assembly or electropermanent magnet assemblies. In such an example, a processor and memory of the computing device may be electronically coupled to a lithium-ion battery of the computing device, which may be disposed in a housing of the computing device. As an example, a power storage unit may be independent of such a lithium-ion battery. As an example, a power storage unit can be or can include a capacitor. For example, consider a capacitor that may be charged to provide a current in a single particular direction or selectively in one of two directions to an electropermanent magnet. As an example, a capacitor may be charged via a battery of a computing device, which may occur periodically and/or responsive to an event. For example, upon discharging energy from a capacitor to cause a reduction in magnetic field strength of an electropermanent magnet to move one shell with respect to another shell of a housing to access an interior space of the housing, the capacitor may be recharged upon moving the shell or shells to close off the interior space of the housing. For example, the capacitor may be carried by one of the shells with circuitry that disconnects upon movement of the shell away from the other shell and that reconnects upon movement of the shell toward the other shell or otherwise when the shells are in a coupled state. Once coupled, the capacitor may be sufficiently recharged and then discharged to cause an increase in magnetic field strength of the electropermanent magnet or electropermanent magnets and then once again recharged, which may be at a particular time according to one or more signals, events, etc. (e.g., start-up, etc.), to be ready to provide power (e.g., current) for another instance where one of the shells is to be moved to access the interior space of the housing.

As an example, a first shell of a housing can be coupled to a second shell of the housing via magnetic force provided by one or more electropermanent magnets and without rotatable fasteners (e.g., without screws, bolts, etc.).

As an example, a computing device can include a rotatable fastener that couples a first shell to a second shell of a housing, where magnet control circuitry for one or more electropermanent magnets depends on a position of the rotatable fastener. For example, consider a rotatable fastener that can rotate to mechanically release a shell from another shell and to electronically cause magnet control circuitry and/or power circuitry to provide current to an electropermanent magnetic to cause a reduction in magnetic attraction force of the electropermanent magnetic with respect to a keeper. In such an example, the rotatable fastener may be rotatable in an opposite direction to mechanically secure the shell to the other shell and to electronically to electronically cause magnet control circuitry and/or power circuitry to provide current to an electropermanent magnetic to cause an increase in magnetic attraction force of the electropermanent magnetic with respect to the keeper. For example, a rotatable fastener may operate as a key that can provide for mechanically securing and de-securing shells of a housing and/or switching state of one or more electropermanent magnets for coupling and decoupling the shells of the housing.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
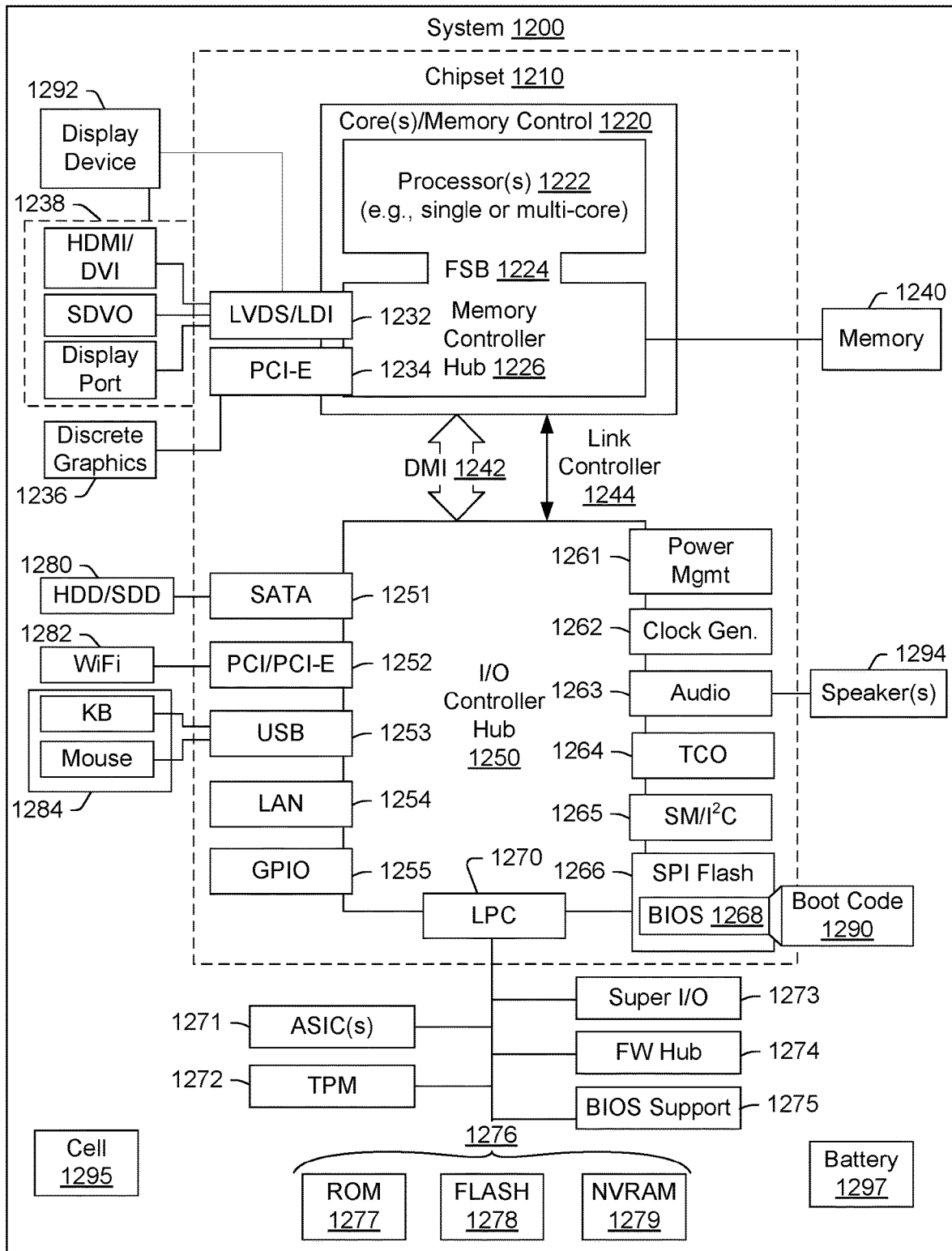
FIG. 12 is a diagram of an example of a system that includes one or more processors.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a satellite, a base, a server or other machine may include other features or only some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
   a processor;
   memory accessible to the processor;
   a lithium-ion battery;
   a power interface;
   magnet control circuitry operatively coupled to at least the power interface for receipt of electrical power; and
   a housing for the processor, the memory, the lithium-ion battery, the power interface and the magnet control circuitry, wherein the housing comprises a first shell, a second shell, and an electropermanent magnet assembly that generates a magnetic force that couples the first shell to the second shell, wherein the electropermanent magnetic assembly is controllable via the magnet control circuitry to decrease the magnetic force to decouple the first shell from the second shell.

2. The computing device of claim 1, wherein the magnet control circuitry is activated by supply of power to the power interface.

3. The computing device of claim 1, wherein the magnet control circuitry is in an inactive state when electrical power of the lithium-ion battery is depleted.

4. The computing device of claim 1, comprising a ferromagnetic target material, wherein the magnetic force is a magnetic attraction force between the electropermanent magnet assembly and the ferromagnetic target material.

5. The computing device of claim 1, wherein the magnet control circuitry reverses polarity of a magnet of the electropermanent magnet assembly to decrease the magnetic force.

6. The computing device of claim 1, wherein the electropermanent magnet assembly comprises a coil that surrounds at least one magnet.

7. The computing device of claim 6, wherein the magnet control circuitry comprises a current pulse generator electrically coupled to the coil.

8. The computing device of claim 1, wherein the first shell and the second shell comprise a tongue and a groove and wherein the magnetic force of the electropermanent magnet assembly is controllable via the magnet control circuitry to cause movement between the tongue and the groove.

9. The computing device of claim 1, comprising firmware instructions stored in the memory that are executable by the processor to establish a firmware environment, wherein status of the magnetic control circuitry is detectable via the firmware environment.

10. The computing device of claim 9, wherein the magnet control circuitry is controllable via the firmware environment.

11. The computing device of claim 1, comprising operating system instructions stored in the memory that are executable by the processor via a boot process to establish an operating system environment.

12. The computing device of claim 11, wherein the boot process depends on a tamper detection status of the magnet control circuitry.

13. The computing device of claim 12, wherein, for a tamper detection status that indicates tampering, the boot process does not allow for establishment of the operating system environment.

14. The computing device of claim 1, comprising a shield material disposed at least in part between the electropermanent magnet assembly and an electronic component disposed in the housing.

15. The computing device of claim 1, comprising a power storage unit, wherein the magnet control circuitry is electronically coupled to the power storage unit for control of the electropermanent magnet assembly.

16. The computing device of claim 15, wherein the processor and the memory are electronically coupled to the lithium-ion battery.

17. The computing device of claim 16, wherein the power storage unit is independent of the lithium-ion battery.

18. The computing device of claim 17, wherein the power storage unit comprises a capacitor.

19. The computing device of claim 1, wherein the first shell is coupled to the second shell via the magnetic force and without rotatable fasteners.

20. The computing device of claim 1, comprising a rotatable fastener that couples the first shell to the second shell, wherein the magnet control circuitry depends on a position of the rotatable fastener.

* * * * *